C. BELDEN.
Garden-Hoe.

No. 134,028.

Patented Dec. 17, 1872.

Witnesses.
R. U. Stanly
A. F. Cornell.

Inventor.
C. Belden
Per Burridge & Co.
Attys

UNITED STATES PATENT OFFICE.

CHARLES BELDEN, OF AKRON, ASSIGNOR OF ONE-HALF HIS RIGHT TO HENRY NEWBURY, OF CLEVELAND, OHIO.

IMPROVEMENT IN GARDEN-HOES.

Specification forming part of Letters Patent No. 134,028, dated December 17, 1872.

*To all whom it may concern:*

Be it known that I, CHARLES BELDEN, of Akron, in the county of Summit and State of Ohio, have invented a certain new and Improved Combined Hoe and Weeding Tool; and I do hereby declare that the following is a full, clear, and complete description thereof, reference being had to the accompanying drawing making part of the same.

Figure 1:
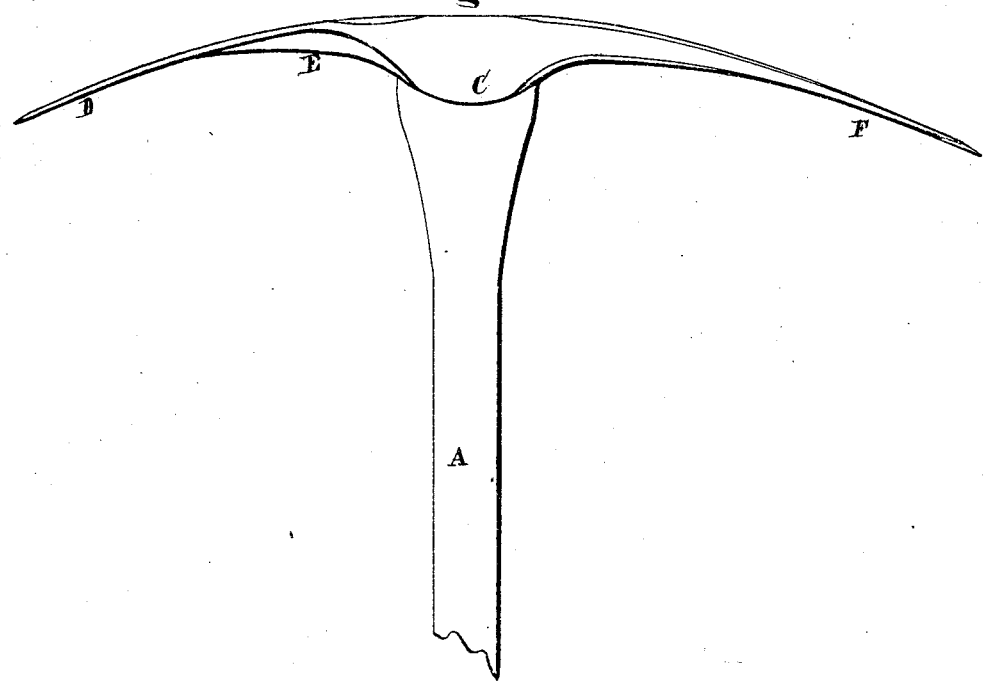
Figure 2:
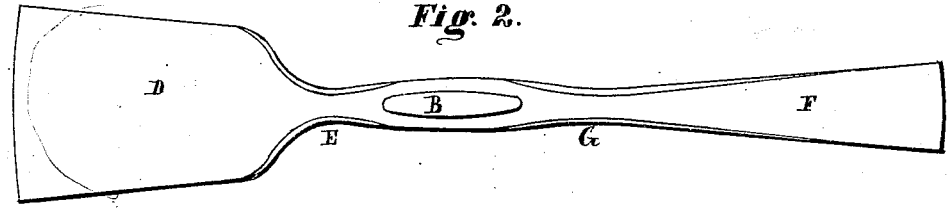

Figure 1 is a side view of the hoe. Fig. 2 is a front view.

Like letters of reference refer to like parts in the several views.

The nature of this invention relates to a hoe for gardening purposes; and which hoe consists of a wide bill or blade projecting in a curving manner from one side of the handle, and a narrower bill or blade projecting in like manner from the opposite side; the special object of the hoe being for working in and among plants and between narrow rows of plants, for weeding, and loosening up the soil.

The construction of said hoe is clearly shown in the drawing, in which A is the handle, tightly secured in an elongated eye, B, provided with a pair of ears, C, for greater strength and security of the handle. D is a wide bill or blade, made very thin and of the shape shown in Fig. 2. Said blade is connected to the eye by a short, stout neck, E. The opposite bill or blade F is long, thin, and narrow, and of the shape shown, and is connected to the eye by a slender neck, G. Each of the bills is alike provided with a sharp cutting-edge and slightly rounded, as shown in the drawing.

This implement is especially intended for hoeing among plants that are set closely together and between narrow rows of such plants. The implement is light, strong, and durable, and is well adapted to heavy as well as light work. The tool is narrower in cross-section at the eye B than the narrow point F.

Claim.

What I claim as my invention, and desire to secure by Letters Patent, is—

The herein-described garden hoe and weeder combined, constructed, as described, as a new article of manufacture.

CHARLES BELDEN.

Witnesses:
W. H. BURRIDGE,
A. F. CORNELL.